United States Patent
Mäki et al.

(10) Patent No.: US 12,206,953 B2
(45) Date of Patent: Jan. 21, 2025

(54) ARRANGEMENT FOR ADJUSTING FREQUENCY RESPONSE

(71) Applicant: Teleste Oyj, Littoinen (FI)

(72) Inventors: Kari Mäki, Turku (FI); Sami Halen, Kaarina (FI)

(73) Assignee: Teleste Networks Oy, Littoinen (FI)

( * ) Notice: Subject to any disclaimer, the term of this patent is extended or adjusted under 35 U.S.C. 154(b) by 0 days.

(21) Appl. No.: 18/120,080

(22) Filed: Mar. 10, 2023

(65) Prior Publication Data
US 2023/0300423 A1 Sep. 21, 2023

(30) Foreign Application Priority Data
Mar. 17, 2022 (FI) .................................... 20225239

(51) Int. Cl.
H04N 7/16 (2011.01)
H04N 21/61 (2011.01)
H04N 21/647 (2011.01)

(52) U.S. Cl.
CPC ..... *H04N 21/615* (2013.01); *H04N 21/64738* (2013.01)

(58) Field of Classification Search
CPC .......... H04N 21/615; H04N 21/64738; H04N 7/102; H04B 3/14; H04B 3/10; H04B 1/76
See application file for complete search history.

(56) References Cited

U.S. PATENT DOCUMENTS

| | | | | |
|---|---|---|---|---|
| 5,724,344 A | * | 3/1998 | Beck | H04B 3/10 370/295 |
| 2002/0008902 A1 | * | 1/2002 | Akiyama | H01S 3/094003 359/341.4 |

(Continued)

FOREIGN PATENT DOCUMENTS

| | | |
|---|---|---|
| CN | 202713361 U | 1/2013 |
| EP | 2919460 A1 | 9/2015 |
| WO | WO 2019/086748 A1 | 5/2019 |

OTHER PUBLICATIONS

Finnish Patent Application No. 20225239, filed Mar. 17, 2022; Office Action issued Aug. 11, 2022, English language translation included, 8 pages.

(Continued)

*Primary Examiner* — Gigi L Dubasky
(74) *Attorney, Agent, or Firm* — MUETING RAASCH GROUP (57) ABSTRACT

A network element of a cable television (CATV) network, comprising at least a first and a second downstream amplifier stage; a first signal path comprising a first equalizer and a second signal path comprising a second equalizer between the first and the second amplifier stage; a switch configured to connect the first equalizer or the second equalizer to be used between the first and the second amplifier stage; a sampling circuit configured to provide a first sampling signal associated with the first signal path and a second sampling signal associated with the second signal path from an output of the second amplifier stage; and a control unit configured to control the switch to connect the first signal path or the second signal path to be used between the first and the second amplifier stage based on said first and second sampling signals.

13 Claims, 3 Drawing Sheets

(56) References Cited

U.S. PATENT DOCUMENTS

| | | | |
|---|---|---|---|
| 2004/0150478 A1* | 8/2004 | Richardson | H03F 1/086 |
| | | | 330/288 |
| 2005/0246755 A1 | 11/2005 | Sandaluk et al. | |
| 2011/0237182 A1 | 9/2011 | Stratford et al. | |
| 2011/0292989 A1* | 12/2011 | Nguyen | H04L 25/03006 |
| | | | 375/229 |
| 2013/0142244 A1 | 6/2013 | Tan | |
| 2015/0256215 A1* | 9/2015 | Hope | H04B 1/525 |
| | | | 370/430 |
| 2016/0173815 A1* | 6/2016 | Yin | H04B 3/04 |
| | | | 348/607 |
| 2020/0314510 A1* | 10/2020 | Fagerlund | H04B 10/25751 |

OTHER PUBLICATIONS

European Application No. 23161644.2, European Search Report issued Jun. 23, 2023; 8 pages.

* cited by examiner

Fig. 1

- - Prior art - -

ARRANGEMENT FOR ADJUSTING FREQUENCY RESPONSE

RELATED PATENT DOCUMENTS

This application claims the benefit of priority under 35 U.S.C. § 119(a) to FI Application No. 20225239, filed 17 Mar. 2022, the disclosure of which is incorporated by reference herein in its entirety.

FIELD OF THE INVENTION

The invention relates to cable television (CATV) networks, and especially to frequency response correction of network elements.

BACKGROUND

CATV networks may be implemented with various techniques and network topologies, but currently most cable television networks are implemented as so-called HFC networks (Hybrid Fiber Coax), i.e. as combinations of a fibre network and a coaxial cable network. The terms CATV network, broadband data network and HFC network may be used interchangeably.

Data Over Cable Service Interface Specification (DOCSIS) is a CATV standard providing specifications for high-bandwidth data transfer in an existing CATV system. The latest versions DOCSIS 3.1 and 4.0 enable the cable network operators to significantly increase both the downstream and upstream data throughput using the existing HFC networks. One issue relating to the introduction of DOCSIS 3.1 and the forthcoming 4.0 is the need to eventually adjust the frequency range and the bandwidth of the communication channels. The development of DOCSIS in 3.x and 4.0 versions will require expanding the upper frequency edge of the RF signals to 1.8 GHz, and eventually even over 3 GHz.

The coaxial network segments also comprise passive network elements, i.e. so-called network passives, such as splitters and taps, between the cables and the amplifiers. The network passives have also a negative slope like cables, but the shape of their slope is not following the slope curve of a coaxial cable. When the slope caused by passives is equalized with the equalizers designed for cables, the frequency response is not anymore optimal. Extending the upper frequency edge of the downstream bandwidth closer to 2 GHz poses further challenges, because e.g. in the 1.8 GHz networks the splitters and the taps will exhibit more negative slope than in 1 GHz networks.

Therefore, an improved arrangement is needed for frequency response correction in CATV nodes.

BRIEF SUMMARY

Now, an improved arrangement has been developed to reduce the above-mentioned problems. As aspects of the invention, we present a network element of a cable television network, which is characterized in what will be presented in the independent claim.

The dependent claims disclose advantageous embodiments of the invention.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the invention, there is provided a network element of a cable television (CATV) network, said network element comprising at least a first and a second downstream amplifier stage; a first signal path comprising a first equalizer and a second signal path comprising a second equalizer between the first and the second amplifier stage; a switch configured to connect the first equalizer or the second equalizer to be used between the first and the second amplifier stage; a sampling circuit configured to provide a first sampling signal associated with the first signal path and a second sampling signal associated with the second signal path from an output of the second amplifier stage; and a control unit configured to control the switch to connect the first signal path or the second signal path to be used between the first and the second amplifier stage based on said first and second sampling signals.

According to an embodiment, said first equalizer provides a first frequency response correction for a given frequency range, said first frequency response correction corresponding approximately to a frequency response correction applied for a coaxial cable attenuation, and said second equalizer provides a second frequency response correction for said given frequency range, wherein a level of said second frequency response correction at least in middle frequencies of said given frequency range is lower that the level of the first frequency response correction.

According to an embodiment, said control unit is configured to measure signal level of the first and second sampling signals on at least one predefined frequency; compare the signal level of the first and second sampling signals to a predefined target level; and output a control signal, based on the comparison, for controlling the switch to connect the first signal path or the second signal path to be used between the first and the second amplifier stage.

According to an embodiment, the network element comprises a functionality for determining primary pilot signal frequencies to be used for adjusting gain and/or slope of amplifier units, wherein said functionality is configured to determine at least two secondary pilot signal frequencies and said control unit is configured to measure signal level of the first and second sampling signals on said at least two secondary pilot signal frequencies; compare the signal level of the first and second sampling signals to predefined target levels at the secondary pilot signal frequencies; and output said control signal based on the comparison.

According to an embodiment, said control unit is configured to output said control signal such that, among the first and second signal path, the signal path providing the signal level of the sampling signal closer to the predefined target levels at the secondary pilot signal frequencies is selected to be used between the first and the second amplifier stage.

According to an embodiment, a first secondary pilot signal frequency is configured to be determined lower than a middle frequency of said given frequency range and a second secondary pilot signal frequency is configured to be determined higher than the middle frequency of said given frequency range.

According to an embodiment, the first and/or the second signal path comprises at least one socket for a plug-in equalizer.

According to an embodiment, the at least one socket for the plug-in equalizer on the first signal path is connectable to the second signal path and the at least one socket for the plug-in equalizer on the second signal path is connectable to the first signal path.

According to an embodiment, the network element comprises one or more further signal paths each comprising an equalizer between the first and the second amplifier stage; wherein the sampling circuit is configured to provide a sampling signal associated with each of the signal paths from the output of the second amplifier stage; and the control unit configured to control the switch to connect one of said signal paths used between the first and the second amplifier stage based on said sampling signals associated with each of the signal paths.

According to an embodiment, the network element comprises a computer program code, stored in a non-transitory memory means, for controlling the control unit to carry out its operation.

These and other aspects, embodiments and advantages will be presented later in the detailed description of the invention.

BRIEF DESCRIPTION OF THE DRAWINGS

The invention will now be described in more detail in connection with preferred embodiments with reference to the appended drawings, in which.

DETAILED DESCRIPTION OF THE EMBODIMENTS

Figure 1:
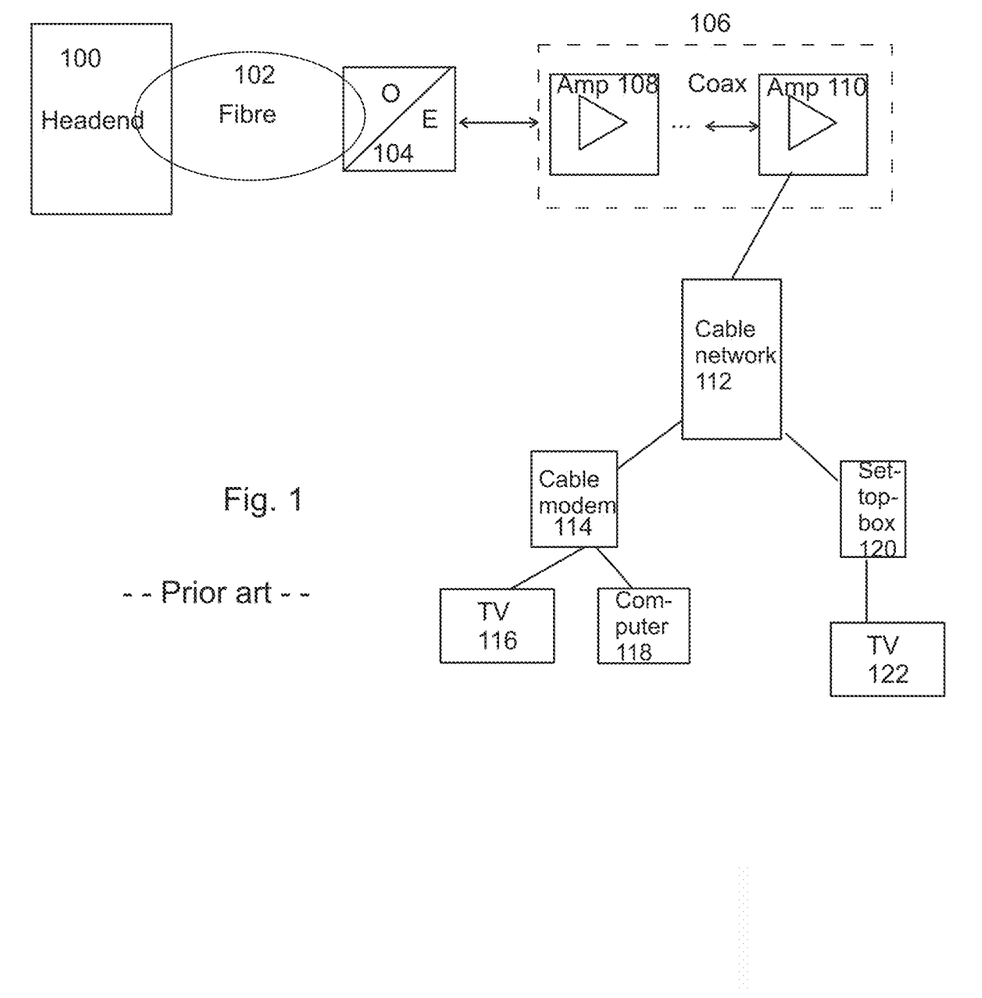
FIG. 1 shows the general structure of a typical HFC network.

FIG. 1 shows the general structure of a typical HFC network. Program services are introduced from the main amplifier 100 (a so-called headend or CCAP) of the network via an optical fibre network 102 to a fibre node 104, which converts the optical signal to an electric signal to be relayed further in a coaxial cable network 106. Such a node 104 can be an analogue node or a so-called RPD/RMD node. Depending on the length, branching, topology, etc. of the coaxial cable network, this coaxial cable segment typically comprises one or more broadband amplifiers 108, 110 for amplifying program service signals in a heavily attenuating coaxial media. From the amplifier the program service signals are introduced to a cable network 112 of a smaller area, such as a distribution network of an apartment building, which are typically implemented as coaxial tree or star networks comprising signal splitters for distributing the program service signals to each customer. The cable network 112, such as the distribution network of an apartment, may further comprise a Network Interface Unit (NIU) or Point of Entry (PoE) device arranged to divide signals to appropriate home appliances. The NIU may operate as a home amplifier. From a wall outlet the signal is further relayed either via a cable modem 114 to a television receiver 116 or a computer 118, or via a so-called set-top box 120 to a television receiver 122.

The HFC network may be implemented according to various standards. In Europe, video transmission in the HFC networks have traditionally been implemented according to DVB-C (Digital Video Broadcasting-Cable) standard, but currently there is an on-going shift to more widely use the DOCSIS (Data Over Cable Service Interface Specification) standard.

DOCSIS is a CATV standard providing specifications for high-bandwidth data transfer in an existing CATV system. DOCSIS may be employed to provide Internet access over existing hybrid fiber-coaxial (HFC) infrastructure of cable television operators. DOCSIS has been evolved through versions 1.0, 1.1, 2.0, 3.0 and 3.1 to the latest version of 4.0.

When implementing the HFC network of FIG. 1 according to DOCSIS, the headend 100 of the CATV network comprises inputs for signals, such as TV signals and IP signals, a television signal modulator and a cable modem termination system (CMTS). The CMTS provides high-speed data services to customers thorough cable modems (CM; 114) locating in homes. The CMTS forms the interface to the IP-based network over the Internet. It modulates the data from the Internet for downstream transmission to homes and receives the upstream data from homes. The CMTS additionally manages the load balancing, error correction parameters and the class of service (CoS).

Signals from the headend 100 are distributed optically (fiber network 102) to within the vicinity of individual homes, where the optical signals are converted to electrical signals at the terminating points 104. The electrical signals are then distributed to the various homes via the existing 75 ohm coaxial cables 106. The maximum data transfer of the coaxial cables is limited due to strong frequency-based attenuation. Therefore, the electrical signals transmitted over coaxial cables must be amplified. The amplifiers 108, 110 used for this purpose are suited to a specific frequency range. In addition, the upstream and downstream must occur over the same physical connection. The last part 112 of the coaxial connection between the CMTS and the CMs branches off in a star or a tree structure. A CMTS transmits the same data to all CMs located along the same section of cable (one-to-many communications). A request/grant mechanism exists between the CMTS and the CMs, meaning that a CM needing to transmit data must first send a request to the CMTS, after which it can transmit at the time assigned to it.

Depending on the version of DOCSIS used in the CATV network, there is a great variety in options available for configuring the network. For the downstream channel width, all versions of DOCSIS earlier than 3.1 use either 6 MHz channels (e.g. North America) or 8 MHz channels (so-called "EuroDOCSIS"). However, the upstream channel width may vary between 200 kHz and 3.2 MHz (versions 1.0/1.1), and even to 6.4 MHz (version 2.0).

DOCSIS 3.1 specifications support capacities of at least 10 Gbit/s downstream and 1 Gbit/s upstream using 4096 QAM. DOCSIS 3.1 rejects the 6 or 8 MHz wide channel spacing and uses narrower orthogonal frequency-division multiplexing (OFDM) subcarriers being 20 kHz to 50 kHz wide, which subcarriers can be combined within a block spectrum of maximum of 192 MHz wide.

DOCSIS 3.1 further provides the concept of Distributed CCAP Architecture (DCA). Converged Cable Access Platform (CCAP) may be defined as an access-side networking element or set of elements that combines the functionality of a CMTS with that of an Edge QAM (i.e. the modulation), providing high-density services to cable subscribers. Conventionally, the CCAP functionalities have been implemented in the headend/hub, such as the headend 100 in FIG. 1. In a DCA, some features of the CCAP are distributed from headend/hub to the network elements closer to the customers, for example to the fibre nodes 104 in FIG. 1. The CCAP functionalities left to be implemented in the headend/hub may be referred to as CCAP core.

DOCSIS 3.1 specifies at least two network element concepts, i.e. a Remote PHY Device (RPD) and a Remote-MACPHY Device (RMD), to which some functionalities of the headend can be distributed. A recent version of DOCSIS 3.1 specification also provided Annex F introducing a Full Duplex DOCSIS 3.1 technology, where a new distributed access node called Full Duplex (FDX) Node is determined. These network elements implementing at least part of the CCAP functionalities may be referred to as DCA nodes.

One issue relating to the introduction of DOCSIS 3.1 and 4.0 is the need to eventually adjust the frequency range and the bandwidth of the communication channels to meet the requirements of faster communication. The older DOCSIS standards up to the version 3.0 provide an upstream bandwidth of 5-42 MHz (in Americas) or 5-65 MHz (in Europe) and a downstream bandwidth of 85-862 MHz or even up to 1.0 GHz. DOCSIS 3.1 introduces a downstream band up to 1218 MHz. In DOCSIS 3.1, the upper frequency edge of the upstream bandwidth is raised to 204 MHz, causing the lower frequency edge of the downstream bandwidth to be raised to 258 MHz. The development of DOCSIS in 3.x and 4.0 versions will require expanding the upper frequency edge of the RF signals to 1.8 GHz, and eventually even over 3 GHz. In the so-called 1.8 GHz products, the downstream bandwidth range will be 258-1794 MHz.

Typically, most of the CATV amplifiers are configured to align gain and slope at the output such that the output signal has a fixed signal level, which has been aligned at the input side or between forward amplifier stages. The CATV amplifiers typically have forward path (i.e. downstream) amplifier stages including an input amplifier stage, a mid-amplifier stage and an output amplifier stage. The CATV amplifiers typically have at least two equalizers for equalizing the frequency response distortion caused by the coaxial cables. These so-called cable equalizers typically locate at the input and in the mid stage position and are configured to create a positive slope (tilt) that is aimed to have a frequency response that is opposite to the frequency response of the coaxial cables used in the networks.

Figure 2:
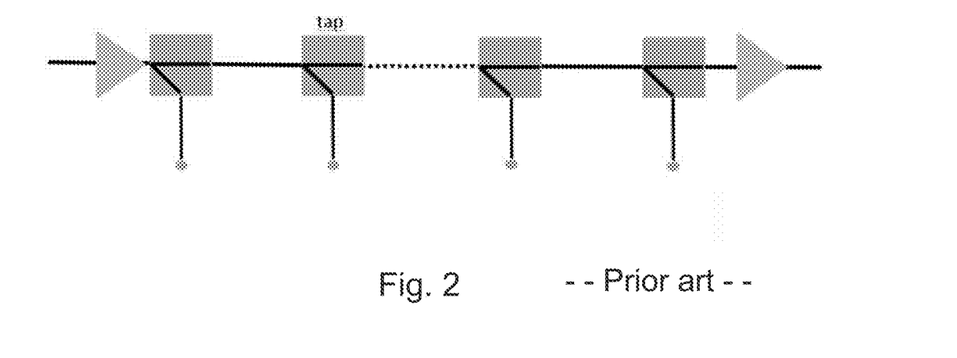
FIG. 2 shows an example of a span of the network comprising cables and a plurality of taps between amplifiers.

The coaxial network segments also comprise passive network elements, i.e. so-called network passives, such as splitters and taps, between the cables and the amplifiers. FIG. 2 shows an example of a span of the network comprising cables and a plurality of taps between the amplifiers. The network passives have also a negative slope like cables, but the shape of their slope is not following the slope curve of a coaxial cable. When the slope caused by passives is equalized with the equalizers designed for cables, the frequency response is not anymore optimal, i.e. flat response curve with approximately zero attenuation. Instead, this typically results in a so-called "haystack" frequency response, where the mid frequencies have higher RF level than intended.

The number of the network passives in a span of the network may typically vary between 0-6, as exemplified in FIG. 2. However, the cable equalizers of the amplifiers cannot be designed so that they could adapt to the variations of the number or the type of the network passives. In the 1.8 GHz networks, the problem is even more challenging, because the splitters and the taps will exhibit more negative slope than in 1 GHz networks.

Figure 3:
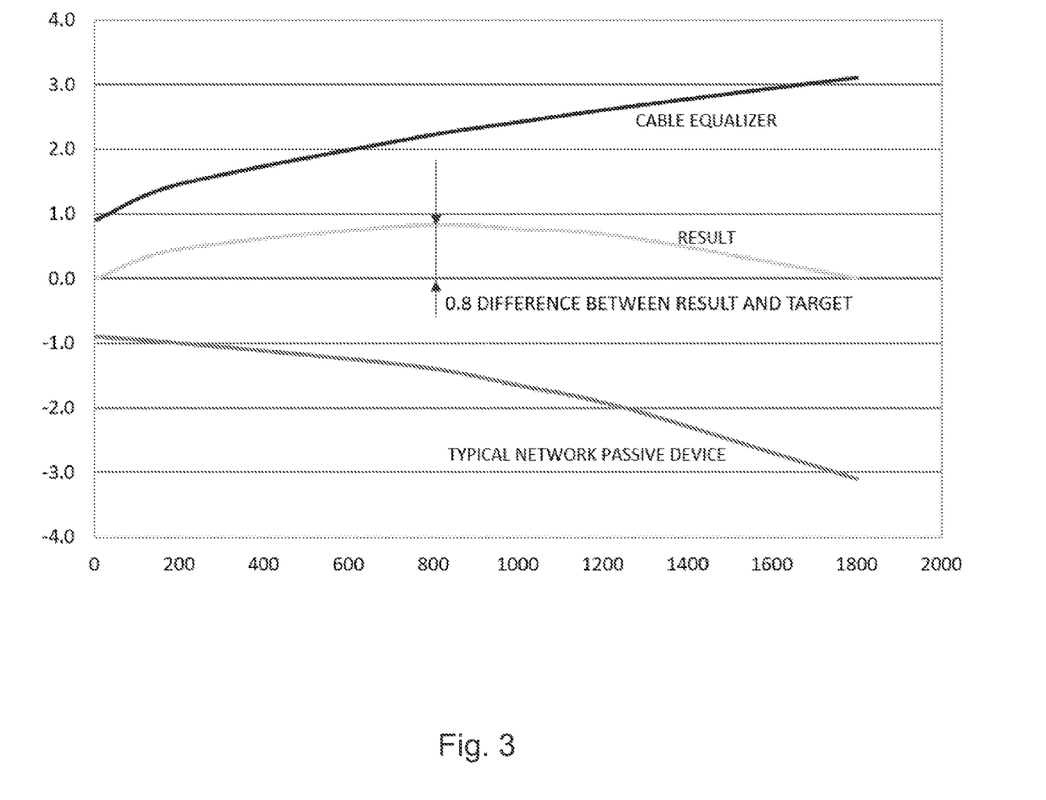
FIG. 3 shows an example of a deviation of a frequency response caused by network passives.

FIG. 3 shows an example of a "haystack" equalization case in a 1.8 GHz network, where a typical 1.8 GHz tap is used. The cable equalizer applies a slope correction to the frequency response of the network passive, where the positive slope correction exceeds to the negative frequency response of the network passive even on low frequencies (below 200 MHz) and reaches its peak of approximately 0.8 dB at about 800 MHz. If the number of the network passives in the span of the network is higher, naturally the error of the frequency response will become larger.

In simple cases, the problem could be tackled by using special plug-in equalizers selected by a field technician and purposed to correct a particular "haystack" frequency response. However, along with the increasing variations of the number or the type of the network passives in a span of the network, the task of selecting an appropriate type of plug-in equalizer becomes more difficult and prone to errors. Moreover, such plugins also cause extra loss in gain that may become problematic especially in 1.8 GHz products that are often limited by gain.

Therefore, an improved arrangement is presented herein for frequency response correction.

According to a first aspect, there is provided a network element of a cable television (CATV) network, said network element comprising at least a first and a second downstream amplifier stage; a first signal path comprising a first equalizer and a second signal path comprising a second equalizer between the first and the second amplifier stage; a switch configured to connect the first signal path or the second signal path to be used between the first and the second amplifier stage; a sampling circuit configured to provide a first sampling signal associated with the first signal path and a second sampling signal associated with the second signal path from an output of the second amplifier stage; and a control unit configured to control the switch to connect the first signal path or the second signal path to be used between the first and the second amplifier stage based on said first and second sampling signals.

Thus, the CATV node is provided with two alternative signal paths to be used between the first and the second downstream amplifier stage, both signal paths comprising an equalizer. At least two sampling signals are obtained from the output of the second amplifier stage, a first sampling signal associated with the first signal path and a second sampling signal associated with the second signal path. The sampling signals are provided in a control unit, which based on the sampling signal, decides which signal path shall be used, and controls a switch to connect either the first signal path or the second signal path to be used between the first and the second amplifier stage. Thus, by providing two different alternative signal paths for carrying out the equalization, the signal path addressing better the frequency response attenuation caused, besides by the coaxial cables, but also by the network passives can be chosen to be used.

According to an embodiment, said first equalizer provides a first slope correction for a given frequency range, said first slope correction corresponding approximately to a slope correction applied for a coaxial cable attenuation, and said second equalizer provides a second slope correction for said given frequency range, wherein a level of said second slope correction at least in middle frequencies of said given frequency range is lower that the level of the first slope correction.

Consequently, the first signal path with the first equalizer may be designed such that it has a frequency response addressing a slope curve caused by a standard coaxial cable. The second signal path with the second equalizer, in turn, may be designed such that it has a frequency response addressing a "valley" in the frequency response caused by the network passives at least in the middle frequencies of the used frequency range.

According to an embodiment, the level of said second slope correction at least in said middle frequencies of said given frequency range is 1-1.5 dB lower that the level of the first slope correction.

In most of the cases at least for 1.8 GHz products, a level difference of about 1-1.5 dB lower at the central frequencies is sufficient to address the "valley" in the frequency response caused by the network passives.

The middle/central frequencies as referred to herein are naturally dependent on the given frequency range. For example, the downstream frequency band in 1.8 GHz products being 258-1794 MHz, the middle/central frequencies may comprise the frequency range of approximately 900-1100 MHz. In DOCSIS 3.1 products, the downstream frequency band is 258-1218 MHz, wherein the middle/central frequencies may comprise, for example, the frequency range of approximately 650-850 MHz.

According to an embodiment, said control unit is configured to measure signal level of the first and second sampling signals on at least one predefined frequency; compare the signal level of the first and second sampling signals to a predefined target level; and output a control signal, based on the comparison, for controlling the switch to connect the first signal path or the second signal path to be used between the first and the second amplifier stage.

Hence, there may be at least one predefined frequency, on which the sampling signals for both signal paths are obtained. There may also be a target value for the sampling signal at said frequency. Then based on which signal path provides a sampling signal closer to the target level, the control unit outputs a control signal for controlling the switch to connect said signal path to be used between the first and the second amplifier stage.

According to an embodiment, the network element comprises a functionality for determining primary pilot signal frequencies to be used for adjusting gain and/or slope of amplifier units, wherein said functionality is configured to determine at least two secondary pilot signal frequencies and said control unit is configured to measure signal level of the first and second sampling signals on said at least two secondary pilot signal frequencies; compare the signal level of the first and second sampling signals to predefined target levels at the secondary pilot signal frequencies; and output said control signal based on the comparison.

A network element of a CATV network, such as a broadband amplifier, typically comprises either an automatic gain control (AGC) unit or an automatic level and slope control (ALSC) unit. Such units typically enable forward (i.e downstream) path automatic alignment by adjusting the forward path based on two pilot signals, which may be referred to herein as normal pilot signals, main pilot signals or primary pilot signals. Said units may automatically adjust the gain and the slope of downstream signal path such that the signal levels of the primary pilot signals match the target values.

For the AGC and ALSC units, there are typically reserve or secondary pilot signals available, which may be used e.g. upon a failure of the primary pilot signals. Along with the introduction of DCA nodes, such as RPDs, failures of the primary pilot signals become almost non-existent and the need for reserve pilot signals as the back-up signals diminishes. The usage (on/off) and the frequencies of the reserve pilot signals is typically manually adjustable.

Now according to this embodiment, the automatic alignment of the network element, such the automatic gain control (AGC) process or the automatic level and slope control (ALSC) process, can be used as a basis for the automatic frequency response correction by using the reserve pilots which are currently not used in automatic alignment. Thus, the automatic alignment of the network element is applied using both primary (main) pilot signal and secondary (reserve) pilot signal, and the automatic alignment process is applied to both signal routes. The adjustments of both signal path naturally end up with perfectly adjusted main pilots, but additionally the resulting adjustment error of the reserve pilots is measured for deciding the signal path to be used. Consequently, no new adjustment parameters or measurements are needed, but rather the reserve pilots that are no longer needed in the traditional sense can be utilised for a new purpose.

According to an embodiment, said control unit is configured to output said control signal such that, among the first and second signal path, the signal path providing the signal level of the sampling signal closer to the predefined target levels at the secondary pilot signal frequencies is selected to be used between the first and the second amplifier stage.

Hence, based on the measured adjustment error of the reserve pilots, the signal path is selected which provides less reserve pilot error.

According to an embodiment, a first secondary pilot signal frequency is configured to be determined lower than a middle frequency of said given frequency range and a second secondary pilot signal frequency is configured to be determined higher than the middle frequency of said given frequency range.

For example, in 1.8 GHz products the primary (main) pilot signals used for adjusting gain and/or slope of the amplifier units may be determined on the frequencies of 320 MHz and 1700 MHz. It is preferable to have the frequencies of the secondary (reserve) pilot signals between the frequencies of the primary (main) pilot signals, but still sufficiently remote from middle frequencies of the downstream band, i.e. 258-1794 MHz. Thus, the secondary (reserve) pilot signals may be determined, for example, on the frequency ranges of 400-500 MHz and 1400-1600 MHz, respectively.

It is noted that the frequency response deviation may also take another form than the "haystack", wherein the frequency ranges for the secondary (reserve) pilot signals need to be determined accordingly. The network element may comprise predetermined and/or manually adjustable settings for the reserve pilot frequencies so that they are optimally placed with respect to this frequency response calculation. It is also possible to disable the usage of the reserve signals completely and/or select the preferred signal route manually.

According to an embodiment, the first and/or the second signal path comprises a socket for a plug-in equalizer.

It is also possible to use a plug-in equalizer and its bypass route as a frequency correction element. This can be done instead of or in addition to the beforementioned equalizers on the two signal paths. This allows more flexibility and future proofing for the implementation.

According to an embodiment, the at least one socket for the plug-in equalizer on the first signal path is connectable to the second signal path and the at least one socket for the plug-in equalizer on the second signal path is connectable to the first signal path.

Thus, in the case that the first and the second signal path comprise an equalizer, the possible sockets for the plug-in equalizers on the first and the second signal path may be connectable, e.g. by a switch, to the alternate signal path. This provides four different options for the signal path, which all options may be measured, and the signal path providing the least deviation from the target level may be selected. It is noted that the number of sockets for the plug-in equalizers per signal path is not limited to only one, but there may be a plurality of sockets for the plug-in equalizers per signal path. Consequently, in the case of two sockets for the plug-in equalizers per signal paths, 8 different options for the signal path are usable, in the case of three sockets for the plug-in equalizers per signal paths, 16 different options for the signal path are usable, etc.

According to an embodiment, the network element comprises one or more further signal paths each comprising an equalizer between the first and the second amplifier stage; wherein the sampling circuit is configured to provide a sampling signal associated with each of the signal paths from the output of the second amplifier stage; and the control unit configured to control the switch to connect one of said signal paths used between the first and the second amplifier stage based on said sampling signals associated with each of the signal paths.

Hence, the number of alternative signals paths is not limited to two only, but rather there may be a plurality of signal paths, such as 3, 4, 5, etc., each comprising an equalizer and possibly one or more sockets for the plug-in equalizer. The sampling signal(s) is measured from each of the signal paths and the signal path providing the least deviation from the target level may be selected for use.

It is noted that while the embodiments are described herein using a 1.8 GHz network element as an illustrative example, the embodiments are equally applicable to any network element, especially an amplifier, configured to be installed in a coaxial cable segment of a CATV network. Thus, the embodiments may be applicable to corresponding network elements operating according to DOCSIS 3.1, where the upper frequency edge of the downstream frequency band is about 1.2 GHz (1218 MHz). Especially, the embodiments are applicable to corresponding network elements operating according to DOCSIS 4.0 where the upper frequency edge of the downstream frequency band may be about 3.0 GHz.

Figure 4:
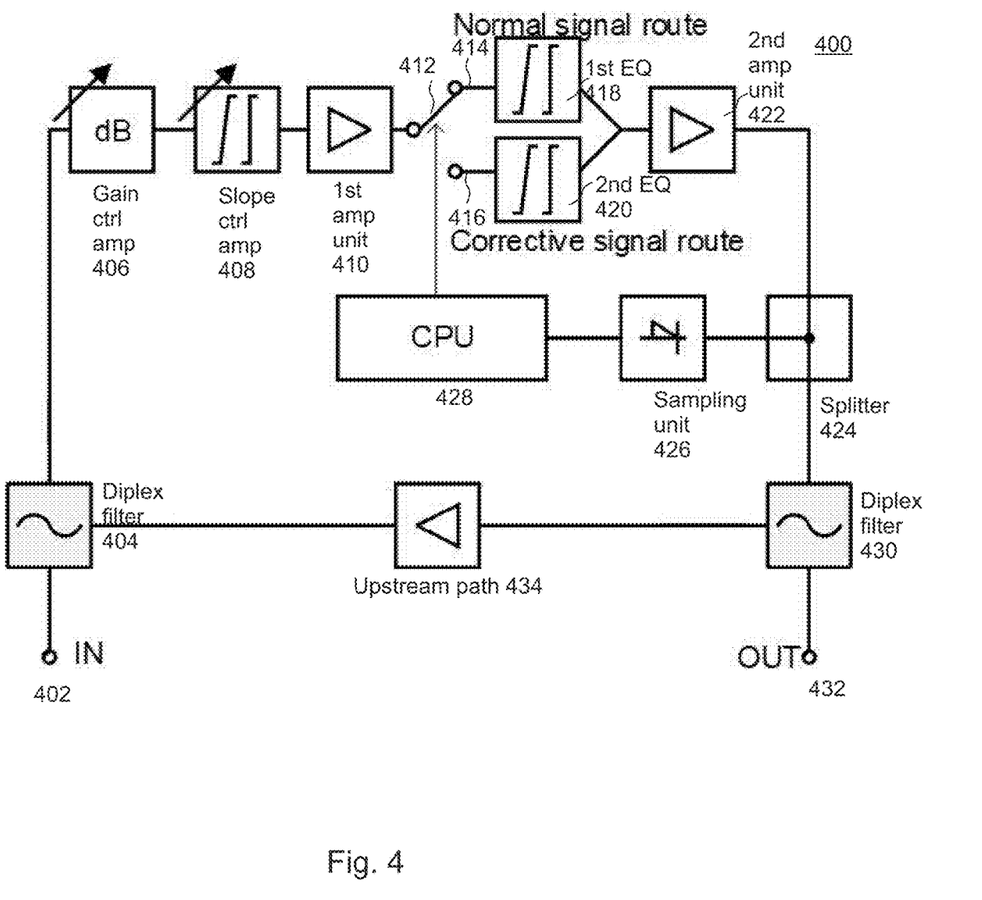
FIG. 4 shows a simplified block chart of a network element according to an embodiment of the invention.

FIG. 4 shows an example of a simplified block chart of a network element, i.e. a CATV amplifier, according to an embodiment. FIG. 4 shows a simplification of the downstream path within the amplifier; thus, no separate components relating to upstream path are shown, but they are commonly referred to with the reference number 434. It is further noted that while FIG. 4 shows the implementation in a broadband amplifier, the embodiments are equally applicable, for example, in a DCA device, such as an RPD/RMD node or an FDX node.

The CATV amplifier 400 comprises a first input/output port 402, which operates as an input for the downstream signals originating from the headend or the CMTS or the CCAP core and an output for the upstream signals originating from the customer devices. The amplifier 400 further comprises a second input/output port 432, which operates as an output for the downstream signals originating from the headend or the CMTS and an input for the upstream signals originating from the customer devices. Both ports 402, 414 are provided with at least one diplex filter 404 and 430, respectively, for filtering the downstream signals and the upstream signals to their respective frequency bands and splitting the downstream and upstream signals to their own signal routes. The upstream path components are commonly referred to with the reference number 434.

The downstream signal path of the network element typically comprises a plurality of amplifier units along the downstream path. FIG. 4 shows only a simplification of the downstream path and depicts only a gain control amplifier unit 406, a slope control amplifier unit 408 and a first (mid-stage) amplifier unit 410. Between the first amplifier unit 410 and a second (output) amplifier unit 422, there are two alternative signal routes, the first (so-called normal) signal route 414 and the second (corrective) signal route 416. The switch 412 is used to select either of the signal routes. The first signal route 414 comprises a first equalizer 418 and the second signal route 416 comprises a second equalizer 420. A sampling circuit may comprise a splitter 424 and a sampling unit 426, which provide the sample signals to a control unit 428, such as a processing unit (CPU). The amplified downstream signals are supplied via the diplex filter 430 and the second input/output port 432 further to a network segment.

The frequency response at least on suitable selected frequencies of both first signal route 414 and the second signal route 416 is estimated such that the sampling circuit 424, 426 provides a first sampling signal associated with the first signal route 414 and a second sampling signal associated with the second signal route 416 from the output of the second amplifier stage 422 to the control unit 428. Based on the first and second sampling signals, the control unit 428 then controls the switch 412 to connect either the first signal route 414 or the second signal route 416 to be used between the first and the second amplifier stage.

Herein, the automatic alignment process of the network element may be utilized, where the primary pilot signal frequencies are used for adjusting gain and/or slope of amplifier units, and the secondary pilot signal frequencies are used to measure signal level of the first and second sampling signals. The signal level of the first and second sampling signals are compared to their predefined target levels, whereupon the control unit 428 provides the control signal to the switch 412 based on which sampling signal was closer to the target level.

As mentioned above, the embodiments are equally applicable in any DCA or non-DCA node producing either digital or analogue output signals. For example, the embodiments may be applied in analogue nodes and broadband amplifiers, or in an RPD/RMD node or an FDX node.

In general, the various embodiments may be implemented in hardware or special purpose circuits or any combination thereof. While various embodiments may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

A skilled person appreciates that any of the embodiments described above may be implemented as a combination with one or more of the other embodiments, unless there is explicitly or implicitly stated that certain embodiments are only alternatives to each other.

According to an embodiment, the network element comprises a computer program code, stored in a non-transitory memory means, for controlling the processing unit to carry out said adjustments.

The various embodiments can be implemented with the help of computer program code that resides in a memory and causes the relevant apparatuses to carry out the invention. Thus, the implementation may include a computer readable storage medium stored with code thereon for use by an apparatus, such as the network element, which when executed by a processor, causes the apparatus to perform the various embodiments or a subset of them. In addition, or alternatively, the implementation may include a computer program embodied on a non-transitory computer readable medium, the computer program comprising instructions causing, when executed on at least one processor, at least one apparatus to perform the various embodiments or a subset of them. For example, an apparatus may comprise circuitry and electronics for handling, receiving and transmitting data, computer program code in a memory, and a processor that, when running the computer program code, causes the apparatus to carry out the features of an embodiment.

It will be obvious for a person skilled in the art that with technological developments, the basic idea of the invention can be implemented in a variety of ways. Thus, the invention and its embodiments are not limited to the above-described examples, but they may vary within the scope of the claims.

The invention claimed is:

1. A network element of a cable television (CATV) network, said network element comprising:
   at least a first and a second downstream amplifier stage, wherein a first equalizer provides a first frequency response correction for a given frequency range, said first frequency response correction corresponding approximately to a frequency response correction applied for a coaxial cable attenuation, and a second equalizer provides a second frequency response correction for said given frequency range, wherein a level of said second frequency response correction at least in middle frequencies of said given frequency range is lower that the level of the first frequency response correction;
   a first signal path comprising the first equalizer and a second signal path comprising the second equalizer between the first and the second downstream amplifier stages;
   a switch configured to connect the first equalizer or the second equalizer to be used between the first and the second downstream amplifier stages;
   a sampling circuit configured to provide a first sampling signal associated with the first signal path and a second sampling signal associated with the second signal path from an output of the second downstream amplifier stages; and
   a control unit configured to control the switch to connect the first signal path or the second signal path to be used between the first and the second downstream amplifier stages based on said first and second sampling signals, wherein the network element comprises a functionality for determining primary pilot signal frequencies to be used for adjusting at least one of gain or slope of amplifier units, wherein said functionality is configured to determine at least two secondary pilot signal frequencies and said control unit is configured to:
      measure signal level of the first and second sampling signals on said at least two secondary pilot signal frequencies;
      compare the signal level of the first and second sampling signals to predefined target levels at the secondary pilot signal frequencies; and
      output said control signal based on the comparison at the secondary pilot signal frequencies.

2. The network element according to claim 1, wherein said control unit is configured to
   measure signal level of the first and second sampling signals on at least one predefined frequency;
   compare the signal level of the first and second sampling signals to a predefined target level; and
   output a control signal, based on the comparison, for controlling the switch to connect the first signal path or the second signal path to be used between the first and the second downstream amplifier stages.

3. The network element according to claim 1, wherein said control unit is configured to output said control signal such that a selected signal path of the first and second signal paths provides the signal level of either the first or the second sampling signal closer to the predefined target levels at the secondary pilot signal frequencies.

4. The network element according to claim 1, wherein a first secondary pilot signal frequency is configured to be determined lower than a middle frequency of a given frequency range and a second secondary pilot signal frequency is configured to be determined higher than the middle frequency of said given frequency range.

5. The network element according to claim 1, wherein at least one of the first or the second signal path comprises at least one socket for a plug-in equalizer.

6. The network element according to claim 5, wherein the at least one socket for the plug-in equalizer on the first signal path is connectable to the second signal path and the at least one socket for the plug-in equalizer on the second signal path is connectable to the first signal path.

7. The network element according to claim 1, comprising
   one or more further signal paths each comprising an equalizer between the first and the second downstream amplifier stages; wherein
   the sampling circuit is configured to provide a sampling signal associated with each of the signal paths from the output of the second downstream amplifier stages; and
   the control unit configured to control the switch to connect one of said signal paths used between the first and the second downstream amplifier stages based on said sampling signals associated with each of the signal paths.

8. The network element according to claim 1, comprising a computer program code, stored in a non-transitory memory means, for controlling the control unit to carry out its operation.

9. The network element according to claim 1, wherein the level of the second frequency response correction compensates for passive network elements coupled between the first and the second downstream amplifier stages.

10. The network element according to claim 1, wherein the network element transmits signals along the first and second signal paths that are modulated at a frequency of 1.8 gigahertz or more.

11. A network element of a cable television (CATV) network, said network element comprising
    at least a first and a second downstream amplifier stage;
    a first signal path comprising a first equalizer and a second signal path comprising a second equalizer between the first and the second downstream amplifier stages;
    a switch configured to connect the first equalizer or the second equalizer to be used between the first and the second downstream amplifier stages;
    a sampling circuit configured to provide a first sampling signal associated with the first signal path and a second sampling signal associated with the second signal path from an output of the second downstream amplifier stages;
    a control unit configured to control the switch to connect the first signal path or the second signal path to be used between the first and the second downstream amplifier stages based on said first and second sampling signals; and
    a functionality for determining primary pilot signal frequencies to be used for adjusting at least one of gain or slope of amplifier units, wherein said functionality is configured to:

determine at least two secondary pilot signal frequencies and said control unit is configured to measure signal level of the first and second sampling signals on said at least two secondary pilot signal frequencies;

compare the signal level of the first and second sampling signals to predefined target levels at the secondary pilot signal frequencies; and output said control signal based on the comparison at the secondary pilot signal frequencies.

12. The network element according to claim 11, wherein said control unit is configured to output said control signal such that, a selected signal path of the first and second signal paths provides the signal level of either the first or second sampling signal closer to the predefined target levels at the secondary pilot signal frequencies.

13. The network element according to claim 11, wherein a first secondary pilot signal frequency is configured to be determined lower than a middle frequency of a given frequency range and a second secondary pilot signal frequency is configured to be determined higher than the middle frequency of said given frequency range.

* * * * *